United States Patent

[11] 3,611,297

[72] Inventors Roger L. Kramer Madison; Roy A. Noffke, Belleville, both of Wis.
[21] Appl. No. 831,492
[22] Filed June 9, 1969
[45] Patented Oct. 5, 1971
[73] Assignee Oak Electro/Netics Corp. Crystal Lake, Del.

[54] REMOTE CONTROL RECEIVER USING A FREQUENCY COUNTER APPROACH
9 Claims, 1 Drawing Fig.

[52] U.S. Cl. .......... 340/171 R, 328/110, 340/148, 340/167 R, 340/171 PPF
[51] Int. Cl. .......... H03k 5/20, H04g 9/00
[50] Field of Search .......... 340/171, 148, 167; 179/84 VF; 325/325, 30, 351, 55, 64; 328/110, 39; 235/150.3, 152, 92 DM

[56] References Cited

UNITED STATES PATENTS

| | | | |
|---|---|---|---|
| 3,263,064 | 7/1966 | Lindars | 235/92 (57) UX |
| 3,341,695 | 9/1967 | Vincent et al. | 235/152 |
| 3,350,579 | 10/1967 | Oman | 328/39 X |
| 3,518,555 | 6/1970 | Konotchick, Jr. | 328/110 |

*Primary Examiner*—Donald J. Yusko
*Attorney*—Parker, Carter & Markey

ABSTRACT: A control circuit in which one of a plurality of different frequency input signals is effective to operate one of a plurality of control stations. The input signals, which may be ultrasonic signals, are converted to electrical signals and then to a train of pulses, in which the frequency of the pulse train is related to the frequency of the input signal. The pulses are counted in a dividing circuit in which the divisor is equal to the number of control stations.

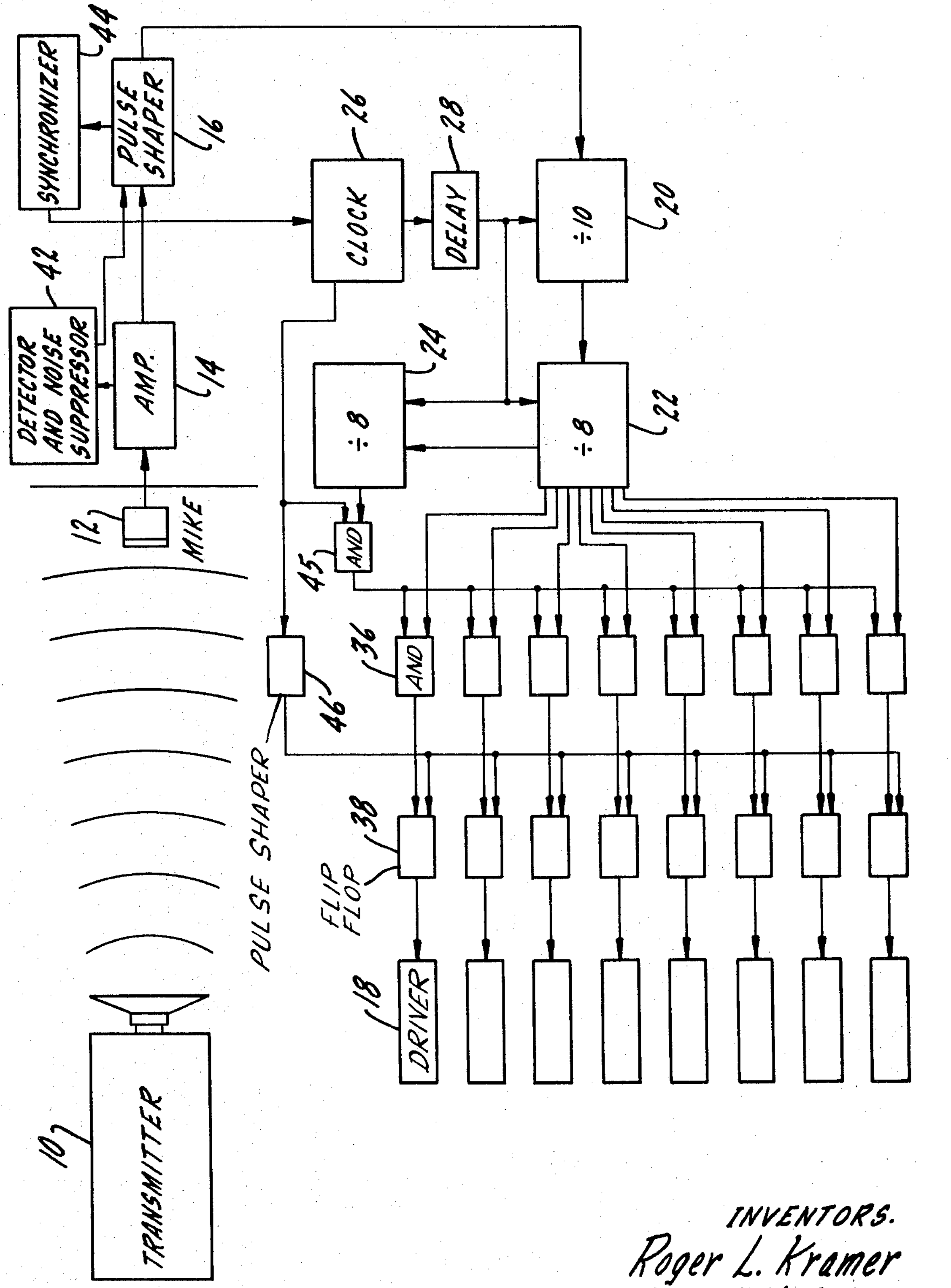
INVENTORS.
Roger L. Kramer
Roy A. Noffke
BY Parker, Carter & Markey
Attorneys.

REMOTE CONTROL RECEIVER USING A FREQUENCY COUNTER APPROACH

SUMMARY OF THE INVENTION

This invention relates to a remote control receiver using a frequency-counter approach to detect differing input frequencies for use in operating one of a plurality of control stations.

A primary purpose of the invention is a remote control receiver of the type customarily used in home TV applications utilizing a frequency counter to detect input frequency.

Another purpose is a circuit of the type described in which the frequency-counting circuit includes at least one dividing circuit, with the divisor being equal to the number of control stations.

Another purpose is a simply constructed reliably operable ultrasonic-frequency receiver utilizing a frequency counter to detect the input signal.

Another purpose is a control circuit of the type described utilizing a pair of dividing circuits in which the divisor of each circuit is the same and is equal to the number of control stations.

Another purpose is a remote control receiver which uses no L-C tuned circuits in detecting input signals of differing frequency.

Other purposes will appear in ensuing specification, drawing and claims.

BRIEF DESCRIPTION OF THE DRAWINGS

The invention is illustrated diagrammatically in the attached block diagram illustrating the preferred form of the invention.

DESCRIPTION OF THE PREFERRED EMBODIMENT

The invention will be described in connection with a remote control transmitter and receiver for use in home television application. Obviously the invention has wider use.

In the FIGURE, a transmitter is indicated generally at 10 and may be an ultrasonic transmitter which provides eight ultrasonic control signals in the frequency range of 34–46 kHz. A microphone or transducer 12 is spaced from the transmitter 10 and is effective to convert the received ultrasonic signal into an electrical sine wave signal of the same frequency. A high gain amplifier 14 is connected to the receiver or microphone 12 and may typically be an integrated circuit which amplifies a 50 microvolt input into a 2 volt output signal. Connected to the amplifier 14 is a pulse-shaping network 16 having a Schmitt trigger circuit which shapes the input signal into a square wave, for example with a 3 volt amplitude. The square wave is then differentiated to produce a train of pulses of the same frequency as that provided by the transmitter 10.

A plurality of control stations are indicated at 18. Each of the stations 18 may be effective to control one of the functions of a television set, for example volume, color, tuning, etc. The stations 18 are indicated diagrammatically and will conventionally be transistor-operated driver circuits. Although the invention will be described as having eight control stations, and thus eight signals of different frequency from the transmitter 10, the invention should not be limited to this particular number of control stations. The number eight has been selected only because the invention is being described in connection with a television remote control receiver.

Connected to the output of the pulse shaper 16 is a counting circuit 20 which, as indicated in FIG. 1, will divide the number of input pulses by 10. Thus, for a 6.9 millisecond timing interval, and assuming an input frequency range of 34–46 kHz. the output from the counting circuit 20 will be between 24 and 31 pulses. A second counting circuit 22 is connected to the output of the counting circuit 10. In this case, the divisor is 8, which is the number of control circuits or control stations. Connected to the output of counting circuit 22 is a third counting circuit 24, which again is a divide-by-eight circuit or a divider circuit having a divisor of 8. All three counting circuits are well known in the art and will not be described in detail. A clock circuit 26 controls resetting of the counting circuits and, assuming a TV remote control application, may have a period of 6.9 milliseconds. One output from the clock circuit 26 goes through a delay network 28 and then to the three counting circuits 20, 22 and 24. The clock pulse from the delay network 28 will be effective to reset all of the counters to zero, after a predetermined delay, as described hereinafter.

Connected to the output of counting circuit 22 are eight "AND" gates 36. Each "AND" gate 36 will have one input from one of the eight outputs of counting circuit 22 and a second input from "AND" gate 45 connected to the output of the "three" level of counting circuit 24. Connected to the output of each of the "AND" gates 36 are eight trigger circuits or flip-flops 38. Each of the trigger circuits 38 have one input from an "AND" gate 36 and a second input from pulse shaper 46 connected to clock 26. The clock 26 also provides an input to "AND" gate 45. It is important to note that the clock pulses which go to "AND" gate 45 and to the trigger circuits 38 are not delayed, but are furnished at the beginning of the clock interval.

Assuming an input frequency of between 34 and 46 kHz. to the receiver 12 and a clock period of 6.9 milliseconds, there will be between 240 and 310 pulses furnished to the counting circuit 20 during the timing interval. The output from counting circuit 20 will be a pulse train of between 24 and 31 pulses in the 6.9 millisecond timing period. Assuming that at the start of the time period all counters are in the zero condition, at the end of the 6.9 millisecond interval, counting circuit 24 will have counted to three and counting circuit 22 will have a number between zero and seven stored in one of its eight outputs.

The undelayed pulse from clock 26 combined in "AND" gate 45 with the output from counter 24, which will be in the "three" condition, will provide an output to the eight "AND" gates 36. One of the "AND" gates 36 will be in a different condition from the others, inasmuch as counter 22 will have any number between zero and seven at its output. Only that "AND" gate 36 which receives inputs from both counter 22 and counter 24 can have an output. The particular "AND" gate 36 which does have an output, provides an input to one of the flip-flops 38. That particular flip-flop or trigger circuit will be placed in one condition, for example the high state, to thus provide an output to its corresponding driver circuit or control station 18.

At the beginning of each clock period, the output of all of trigger circuits 38 will be set to zero by the pulse from clock 26, which pulse will have been shortened by pulse shaper 46. The flip-flops 38 are thus all set to zero. However, one of the flip-flops 38 will immediately change condition due to the signal from the transmitter 10. Thus, one of the driver circuits 18 is then placed in an operating condition. Subsequently, the delayed clock pulse, having passed through the delay network 28, resets all of the counting circuits to zero, so that the cycle may repeat.

The only time there can be an output from one of the "AND" gates 36 is when counting circuit 24 is in the third condition, or has counted to three, and there is a number between zero and seven stored in counter 22.

A noise suppression circuit is indicated at 42 and receives its input from amplifier 14. The output from the noise suppression circuit 42 is a rectified DC signal. When a desired signal is being received at the transducer or receiver 12, the DC level from the noise suppression circuit 42 is constant. During noisy conditions, this DC level will be rapidly changing. The rapidly changing level is capacitively coupled to the base of a transistor in the pulse-shaping circuit, turning the transistor on during noisy conditions, and clamping the trigger circuit in pulse-shaping network to a low level. Thus, the output from the noise suppression circuit is fed to the pulse-shaping network to prevent pulses entering the counter during noisy conditions.

A synchronizing circuit 44 receives its input from the pulse shaper 16 and provides an output to the clock 26. The circuit 44 synchronizes the start of the clock period with the transition of the trigger circuit in the pulse-shaping network.

Of importance is the fact that the divisor in counting circuit 22 is equal to or greater than the number of output stations or control stations. Both counting circuits have to be in a predetermined condition, indicating a frequency within the selected band, before there can be an output to one of the driver circuits or control stations. The invention obviously should not be limited to a divisor of eight, as other divisors may be equally satisfactory, depending upon the number of control stations. In some applications the divisor of counting circuit 22 may be greater than the number of control stations, although it is preferred that the number be equal. The second counter 24 is necessary to restrict outputs to the required frequency band.

The various counting circuits, pulse-shaping networks, amplifiers, etc. have not been described in detail. All such circuits may be conventional. It is the application and arrangement of these various circuits which provides the unique frequency detection circuit shown.

Whereas the preferred form of the invention has been shown and described herein, it should be realized that there are many modifications, alterations and substitutions thereto within the scope of the following claims.

We claim:

1. In a control device in which input signals of different frequency are effective to activate one of a plurality of control stations, an input circuit for receiving different frequency signals, a pulse-forming circuit connected to said input circuit and having a pulse train output whose frequency is related to the input frequency, a plurality of control stations with each station being placed in operation by an input signal of a predetermined frequency, and counting means connected between said pulse-forming circuit and control stations, said counting means having a first dividing circuit in which the divisor is not less than the number of control stations, and a second dividing circuit, the input of said second dividing circuit being connected to the output of said first dividing circuit, and a plurality of gates, one for each control station, each gate having an input from the output of said second dividing circuit and from the output of said first dividing circuit.

2. The circuit of claim 1 further characterized in that said second dividing circuit has a divisor equal to the divisor of said first dividing circuit.

3. The circuit of claim 2 further characterized by and including reset circuit means connected to said dividing circuits, for resetting them to zero, said resetting means having a predetermined period of operation.

4. The circuit of claim 3 further characterized by and including a plurality of flip-flops, one for each control station, connected to the output of said gates, said reset circuit means being connected to the input of each of said flip-flops.

5. The circuit of claim 1 further characterized by a remote transmitter effective to provide different frequency signals to said input circuit.

6. The circuit of claim 1 further characterized in that said input circuit includes amplifying means, and noise suppression means connected to the output of said amplifying means and to the input of said pulse-forming circuit.

7. In a remote control device, a transmitter for providing a plurality of different frequency signals, an input circuit for receiving said signals, a pulse-forming circuit connected to said input circuit and having a pulse train output whose frequency is related to the input frequency, a plurality of control stations, with each station being placed in operation by one of said different frequency input signals, and counting means connected to said pulse-forming circuit, said counting means including two dividing circuits, each having the same divisor, which divisor is equal to the number of control stations, a plurality of gate circuits, one for each control station, with each gate circuit having an input from the output of each dividing circuit, the output of said gate circuits being connected to said control stations.

8. The circuit of claim 7 further characterized by and including clock means for effecting periodic resetting of said dividing circuits and control stations.

9. The circuit of claim 7 further characterized by and including a third dividing circuit connected between the output of said pulse forming circuit and the input of one of said first-named dividing circuits.